United States Patent [19]

Shelton

[11] Patent Number: 5,545,877
[45] Date of Patent: Aug. 13, 1996

[54] COOKING VESSEL WITH WATER DETECTION MEANS

[76] Inventor: David B. Shelton, 11007 Tarrence Rd., Louisville, Ky. 40299

[21] Appl. No.: 253,074

[22] Filed: Jun. 2, 1994

[51] Int. Cl.[6] .................................... H05B 1/02
[52] U.S. Cl. .................. 219/497; 219/492; 219/505; 340/589; 374/107
[58] Field of Search .................. 219/494, 492, 219/497, 501, 508, 505; 374/105, 107; 340/588, 589

[56] References Cited

U.S. PATENT DOCUMENTS

| | | | |
|---|---|---|---|
| 4,503,320 | 3/1985 | Polster | 219/441 |
| 4,585,925 | 4/1986 | Andre | 219/497 |
| 4,913,038 | 4/1990 | Burkett et al. | 99/331 |
| 4,948,950 | 8/1990 | Rae | 219/497 |
| 5,048,400 | 9/1991 | Ueda et al. | 219/441 |
| 5,232,151 | 8/1993 | Mercer et al. | 236/20 R |
| 5,315,350 | 5/1994 | Hirobe et al. | 355/208 |

*Primary Examiner*—Mark H. Paschall

[57] ABSTRACT

Water detection device to determine the presence of water in a cooking device having a vessel adapted to receive a cooking medium such as oil which serves as a heat transfer medium for cooking food in the vessel. The temperature of the medium in the vessel is monitored at selected intervals. The presence of water in the vessel is determined by the detection of a decrease in the rate of temperature rise in the range of the boiling point of water. In the event of a decrease in the rate of temperature rise in the range of 212 degrees Fahrenheit control functions are initiated to prevent further rise in the temperature of the vessel and initiate other necessary precautionary steps. Measurement of the rate of temperature rise can also be adapted to to eliminate the effects of certain occurrences which would tend to provide false indication of the presence of water in the vessel.

2 Claims, 3 Drawing Sheets

COOKING VESSEL WITH WATER DETECTION MEANS

BACKGROUND OF THE INVENTION

The present invention relates in general to cooking equipment and relates more particularly to cooking equipment of the type where a cooking vessel is adapted to receive a liquid other than water, for example oil, to transfer heat to food products in the vessel. The vessel may be open top or closed top. Where closed top vessels are used the cooking process is many times carried out under pressure.

Regardless of whether the vessel is open top or closed top, the presence of water in the vessel can result in dangerous consequences.

Such cooking vessels have a very high heating rate so the contents of the vessel are heated rapidly.

Water can be introduced into such a vessel in a variety of ways. For example, vessels must be periodically cleaned and if the vessel is inadvertently operated in a cooking cycle during the cleaning process the water can be quickly brought to a boil, and even superheated, so that the water boils out of, or in the event of superheating even erupts, from the vessel. The heated water can then cause damage to personnel or property in the area of the cooking device. Because of the necessary heating capability of the cooker the water is not only heated rapidly to the boiling point but significant quantities of heat are added to the boiling water before it leaves the cooker causing further rapid expansion of the steam bubbles and increasing the rate of boilover.

Boilover, or eruption, of the water during the cleaning process where cleaning materials are present in the water is potentially more dangerous the boilover of water in several respects. This is because the cleaning materials modify the nature of the water and can themselves have characteristics which cause further injury to nearby personnel.

First, the presence of any solute in the water will alter the boiling point, and usually raise, the boiling temperature of the water. The increased boiling temperature of the solution alone presents significantly greater potential for injury.

Additionally, most such cleaning materials added to the water have a great potential for injury. For example most cleaning substances include caustic substances such as alkali hydroxides, or equivalent materials, as a base. Such materials alone have the capability to cause severe damage and can be even more dangerous when in a water solution.

For example sodium hydroxide, and most hydroxides have an exothermic reaction with water and when they come in contact with the skin, even in solution, draw water from the flesh and cause burns. If the solution is heated the effect is even more aggravated. Even worse, hydroxides in contact with flesh cause a condition known as "liquefaction necrosis" which includes protein-enzyme dissociation, a decrease in collegen content in the tissue, saponification of cell membrane lipids and cellular death. The extent of the damage is a function of a number of factors such as temperature, concentration and time of exposure.

The effects of exposure to cleaning solutions, particularly hot alkalis emitted from a cooking vessel in boiling water, can be severe. This is one problem which is addressed by the present disclosure.

In any event, the presence of water in the vessel during a cooking cycle is a potentially dangerous problem. One means for detection of circumstances which can lead to the dangerous situations is the subject of the present disclosure.

Other means are also known for the detection of foreign substances in the heat transfer liquid in a cooking process such as disclosed in my copending application Ser. No. 422,750.

Other prior art detection means relate to determination of physical characteristics of the heat transfer medium.

In general, such detection means rely on the measurement of characteristics which are dependent on the heating rate or other characteristic. It has been found that many such detection means are subject to false indication or failure to recognize the presence of the water in the heating medium for several reasons such as the fact they may fail to recognize the effects of agitation of the liquid in the vessel.

Further, in prior art arrangements the detection may be useful in applications where the water is the primary constituent of the material in the vessel and in other cases the detection device may work only when there is a mixture of water and oil in the vessel.

In the case of closed lid cookers the buildup of pressure because of the presence of water in the system is particularly dangerous. In most such cookers, a vent is employed to be closed to allow buildup pressure in the cooker. Operation of a vent to prevent buildup of pressure is also within the scope of the present invention.

Briefly no prior art detection system is known which takes advantage of characteristics of the water or water/oil mixture at the boiling point of water.

SUMMARY OF THE INVENTION

The present invention provides a new, useful, straightforward and effective means to reduce the liklihood of violent eruption of superheated steam and liquid from a heated cooking vessel.

Devices within the scope of the present invention are useful in both covered and uncovered vessels. In the case of covered vessels the system can also be adapted to prevent buildup of pressure in the vessel by operating a vent means in the event water is detected.

While most cooking vessels are electrically heated, devices within the scope of the present invention can be used with other types of vessels such as gas or steam heated vessels.

In general, detection devices within the scope of the present invention monitor the temperature of the liquid in the vessel and compare the temperature with a prior value in the range of the boiling temperature of water which is usually in the range of 212 degrees Fahrenheit.

The range may be changed from time to time depending primarily on altitude where the device is in service since boiling temperature of water is affected by altitude. Other than this one factor, devices once calibrated generally require little additional recalibration.

It is commonly recognized that as a liquid is heated the temperature rises until the temperature is reached where a change of state is to occur so the rate of temperature increase levels off because the heat which would normally go to increase temperature is absorbed to cause the change of state.

Thus if water is placed in the vessel and heated, the temperature rises until the boiling point is reached at which time the temperature levels at the boiling point. The boiling temperature may also vary if there is a nonvolatile solute, such as a cleaning material, in the water. However, the present invention recognizes and accounts for, the variance.

In general, the present invention recognizes that the presence of water can be reliably detected by observing the temperature profile of the material in the vessel.

Briefly, the present invention provides a water detection device to determine the presence of water in a cooking device having a vessel adapted to receive a cooking medium such as oil which serves as a heat transfer medium for cooking food in the vessel. The temperature of the medium in the vessel is monitored at selected intervals. The presence of water in the vessel is determined by the detection of a decrease in the rate of temperature rise in the range of the boiling point of water. In the event of a decrease in the rate of temperature rise in the range of 212 degrees Fahrenheit, control functions are initiated to prevent further rise in the temperature of the vessel and initiate other necessary precautionary steps. Measurement of the rate of temperature rise can also be adapted to to eliminate the effects of certain occurrences which would tend to provide false indication of the presence of water in the vessel.

BRIEF DESCRIPTION OF THE DRAWINGS

Examples of arrangements within the scope of the present invention are illustrated in the accompanying drawings wherein.

DETAILED DESCRIPTION OF THE DRAWINGS

Figure 1:
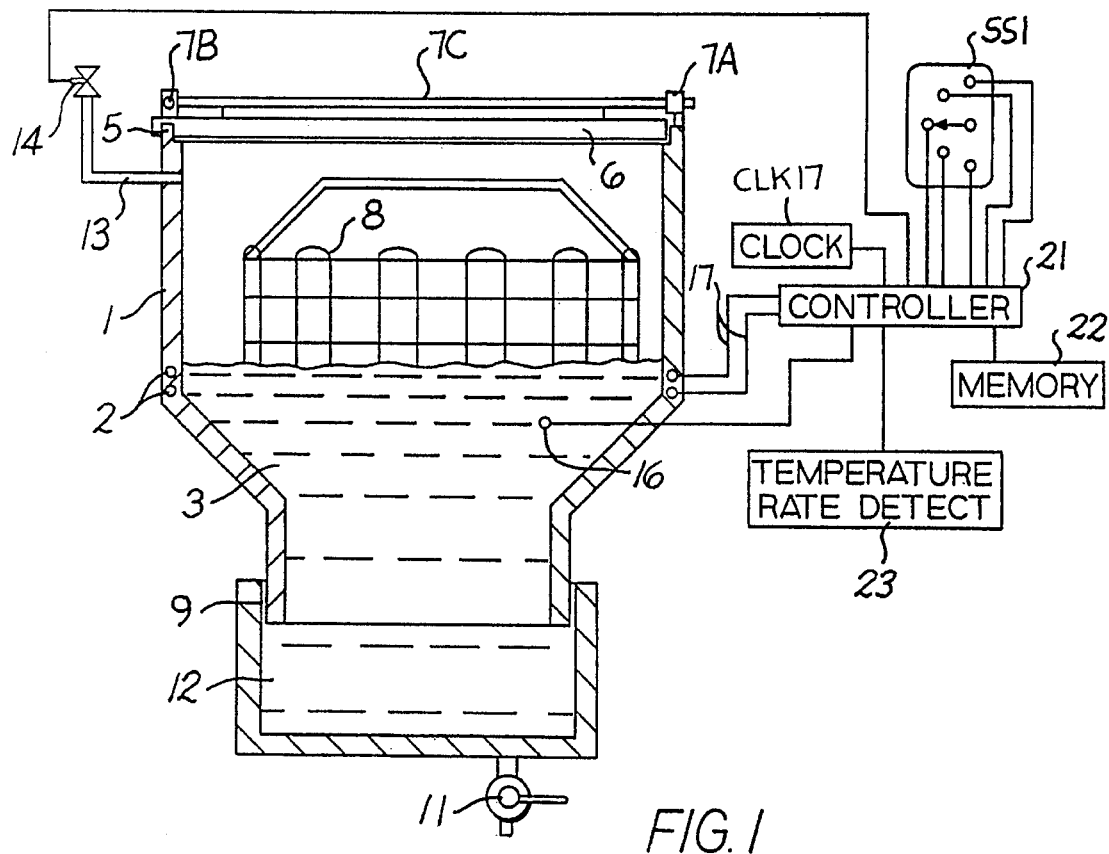
FIG. 1, is a partial cross sectional schematic of a heating and control arrangement within the scope of the present invention.

FIG. 1 is an illustration of one example of an arrangement within the scope of the present invention which includes a cooking vessel 1 adapted to receive a fluid heating medium such as cooking oil 3 for the preparation of foods. Vessel 1 is typically provided with a heater means to heat the cooking medium. In the example of FIG. 1 an electrical coil 2 is provided to transfer heat to the liquid 3. While an electrical heating means is shown in FIG. 1 and described hereinafter it will be understood that other heating means such as steam, gas or oil can be used equally within the scope of the present invention.

Food to be prepared is located within a basket 8 which can in some instances be provided with shelves to allow several layers of food product to be processed.

As also shown an insulated wall can be provided to protect personnel from the heat of the cooker and to conserve energy.

In the example shown a collector 12 is provided at the bottom of the unit and communicates with the vessel to collect particulate matter generated in the processing of the food. The collector can be connected to a bottom outlet of the vessel and a gasket 9 can be provided to prevent leakage. An outlet valve 11 is also provided for draining materials collected in the collector 12 or draining the liquid from the vessel in preparation for cleaning.

The cooker shown in FIG. 1 is a pressure cooker with a top 6 but it will be understood that the use of the invention is not limited to closed top cookers but will operate equally well with any cooker in which there is the likilhood that water may from time to time be present in the cooker.

In the application shown in FIG. 1 lid 6 is held in place by a bar having one end journaled in a pivot 7B and the other received in a holddown 7A when the lid is closed.

In accordance with one feature of the present invention a temperature measuring means 16 such as a thermistor resistance temperature detector (RTD) or thermocouple is located in the liquid to transmit the liquid temperature to a controller 21.

Power is supplied to coil 2 by means of leads 17 from controller 21.

Controller 21 functions to operate the cooking process including monitoring temperature and processing at specific temperatures for selected time periods depending on the particular procedure to be followed.

In this regard a selector switch SS1 is provided where the particular procedure to be followed is selected. For example several different time/temperature algorithms for processing different foods or different quantities of the same food can be stored in memory 22 and recalled by the setting of switches SS1.

An onboard clock CLK 17 can be provided for operating the temperature control program to accomplish specific results.

As also shown, a vent outlet 13 can be provided from the cooker and to a valve 14 for venting the cooker during warmup, after the completion of a cooking cycle or at other times as deemed necessary. The vent valve 14 is also operated by the controller 21.

Of course there is no vent valve in applications where an open top cooker is used.

Clock 17 is also used in applications in accordance with the present invention to determine the rate of temperature rise of the liquid in the vessel as discussed hereinafter with reference to FIG. 2.

Figure 2:
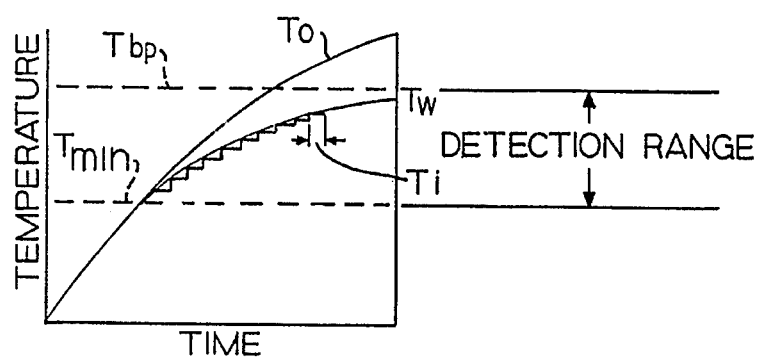
FIG. 2 is a graphic illustration of the operation of an example of an apparatus within the scope of the present invention.

FIG. 2 illustrates one method within the scope of the present invention where sequential measurements of the rate of change of temperature are made. The rate of change measurements can be made continuously throughout the process or, as illustrated in FIG. 2, can be made only through a selected portion of the heating cycle.

In FIG. 2 the detection range is limited to the boiling point of water Tbp to a value Tmin below the boiling point. The span of the detection range is determined by the particular application. For example, the range may vary with the altitude of the device above sea level which affects the boiling point of water as well as the concentration and character of the cleaning material or solute used.

As shown temperature measurements are made at regular time intervals Ti. The system has a sample and hold facility which compares a current measurement with a previous measurement to determine whether the temperature rise rate is flattening indicating the presence of water or continues at a relatively constant rate of rise consistent with the absence of significant water concentration in the vessel.

Figure 4:
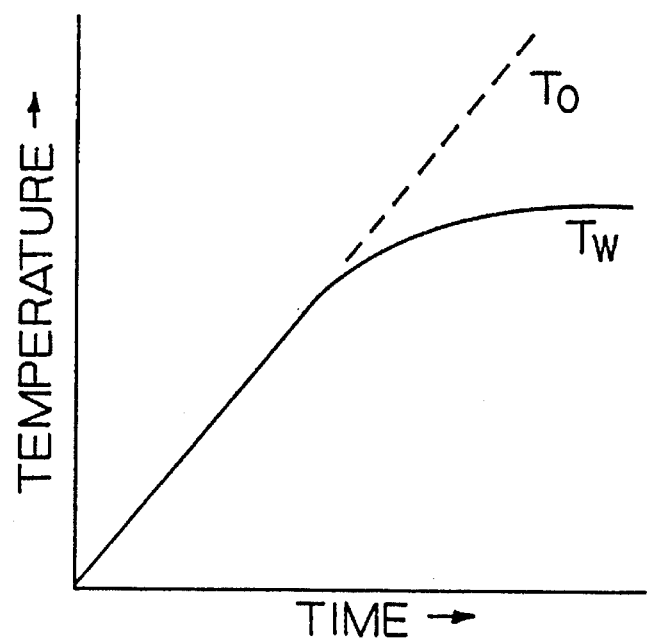
FIG. 4 illustrates graphically one principal of operation of a device within the scope of the present invention.

If water is detected by a flattening of the rate of temperature increase as shown in FIG. 4 in the detection range then the controller limits the temperature of the cooking vessel to a value below the boiling point of water or terminates supply of energy to the heaters.

Also where a pressure vessel is used the vent valve can be maintained in a vent mode to prevent the buildup of pressure from the vaporization of water.

Figure 3:
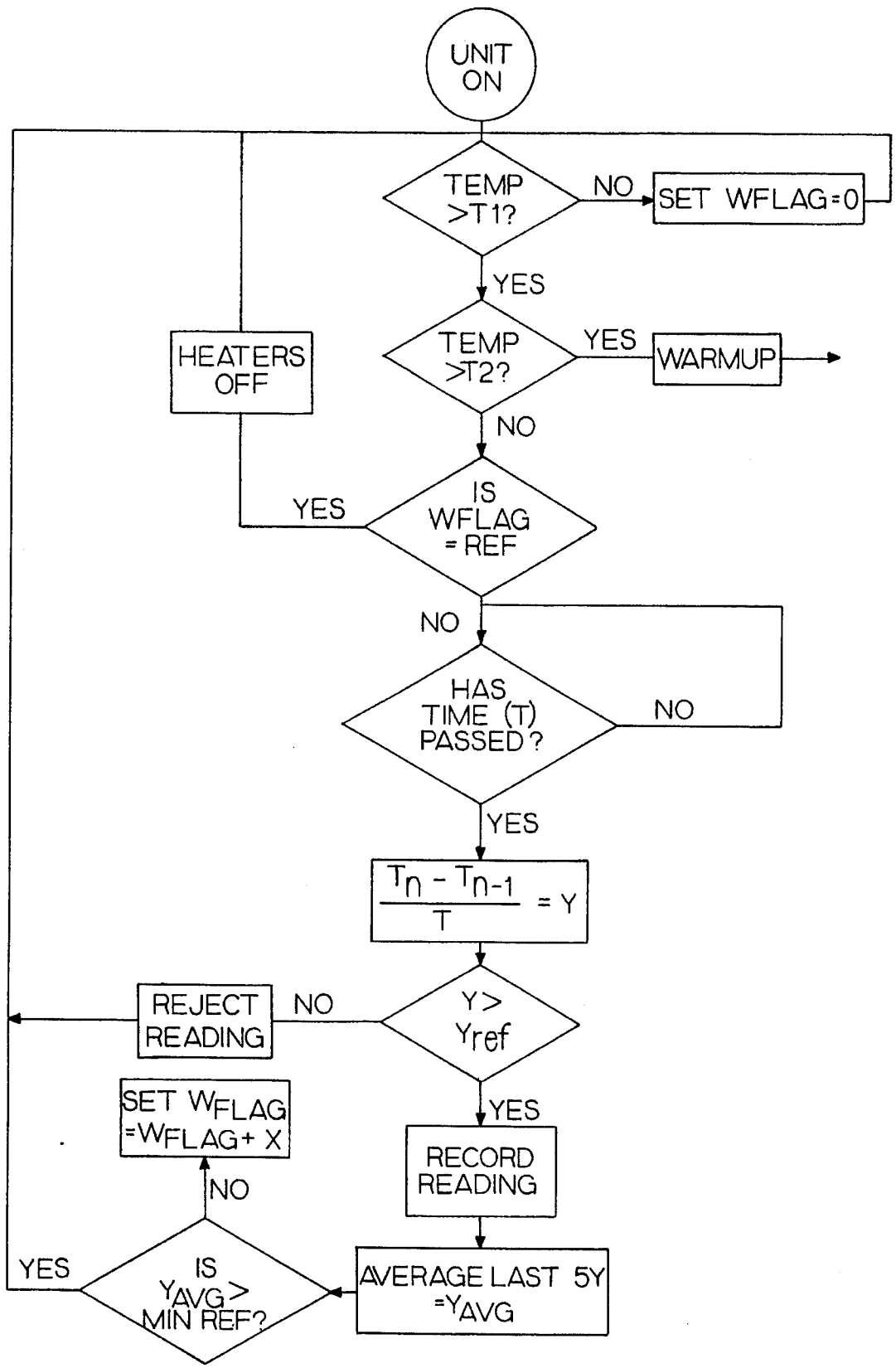
FIG. 3 is a flow chart illustrating sequences of operation of a device within the scope of the present invention.

FIG. 3 illustrates a program sequence which can be used to to make the determinations shown in FIG. 2. It will be recognized that the program steps shown are by way of example and that other equally effective means, software or hardware, can be used to effect the objectives of the present invention.

Figure 5:
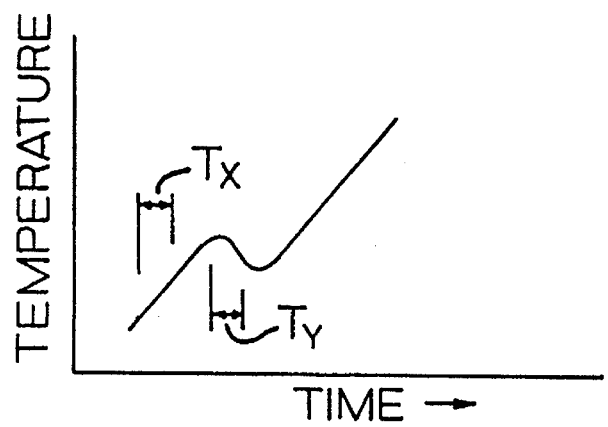
FIG. 5 illustrates yet another feature of a device within the scope of the present invention.

It has been found that in other means for detecting the presence of water in the environment described with reference to cooking vessels various effects such as rate of agitation obscure the presence of water or indicate presence of water when none is present. It has been found that arrangements within the scope of the present invention are far more reliable than other methods for the reasons illustrated in FIG. 5 where what has been found to be a common occurrance is illustrated. The situation illustrated in FIG. 5 usually occurs as a result of agitation of the liquid in the vessel either because of mechanical agitation in the vessel or natural convection. In any event, the detected temperature rise decreases briefly because the temperature detector has been exposed to a pocket of liquid at temperature lower than the bulk of the material in the vessel. If no compensation were made for such an occurrance the signal would indicate the presence of water and terminate operation. However, in accordance with the present invention as illustrated in FIG. 3 the system "throws out" negative temperature changes as well as momentary decreases in the rate of rise of temperature.

It will be understood that the foregoing describes but one example of an arrangement within the scope of the present invention and that other methods and apparatus also within the scope of the present invention will occur to those skilled in the art upon reading the disclosure set forth hereinbefore.

The invention claimed is:

1. A control means for use with a cooking to detect water in a cooking vessel including: cooking chamber means to receive liquid; heater means to supply heat to said liquid in said chamber; control means to measure the temperature of said liquid and control supply of heat of to said liquid to adjust temperature of said liquid; temperature signal retention means to receive said temperature signal and hold said temperature signal; timing means to periodically activate said signal retention means to receive and hold said temperature signal as a current retained signal; memory means to receive and hold said current retained signal and hold at least one previous retained signal and compare said previous retained signals with said current retained signal; calculator means to determine change of said liguid temperature between said previous retained signal and said current retained signal as a current time/temperature differential; second memory means to receive and hold said current time/temperature differential and at least one previous change time/temperature differential; comparator means to receive said current time/temperature differential and said previous time/temperature differential to compare said current time/temperature differential and second controller means to receive said comparator and generate comparator signal to operate said heater control means to restrict supply of heat to said liquid if said previous time/temperature differential said current time/temperature differential are in selected relationship; and switch means to sense said liquid temperature and activate said second controller means when said liquid temperature is in selected temperature range.

2. The invention of claim 1 where said selected temperature range in the range of the boiling temperature of water.

* * * * *